(12) United States Patent
Tarasuk-Levin et al.

(10) Patent No.: US 9,760,443 B2
(45) Date of Patent: Sep. 12, 2017

(54) USING A RECOVERY SNAPSHOT DURING LIVE MIGRATION

(71) Applicant: VMware, Inc., Palo Alto, CA (US)

(72) Inventors: Gabriel Tarasuk-Levin, San Jose, CA (US); Patrick William Penzias Dirks, Los Gatos, CA (US); Ilia Langouev, Santa Cruz, CA (US); Curt Kolovson, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/752,668

(22) Filed: Jun. 26, 2015

(65) Prior Publication Data

US 2015/0378831 A1 Dec. 31, 2015

Related U.S. Application Data

(63) Continuation-in-part of application No. 14/587,980, filed on Dec. 31, 2014, and a continuation-in-part of application No. 14/588,023, filed on Dec. 31, 2014, and a continuation-in-part of application No. 14/587,826, filed on Dec. 31, 2014.

(60) Provisional application No. 62/018,582, filed on Jun. 28, 2014, provisional application No. 62/041,047, filed on Aug. 23, 2014, provisional application No. 62/041,626, filed on Aug. 25, 2014, provisional application No. 62/018,580, filed on Jun. 28, 2014, provisional application No. 62/146,180, filed on Apr. 10, 2015.

(51) Int. Cl.
*G06F 11/14* (2006.01)
*G06F 9/455* (2006.01)
*G06F 11/16* (2006.01)
*G06F 11/20* (2006.01)

(52) U.S. Cl.
CPC ...... *G06F 11/1446* (2013.01); *G06F 9/45558* (2013.01); *G06F 11/1484* (2013.01); *G06F 11/1662* (2013.01); *G06F 11/202* (2013.01); *G06F 2009/4557* (2013.01); *G06F 2201/82* (2013.01); *G06F 2201/825* (2013.01)

(58) Field of Classification Search
CPC .......... G06F 11/1446; G06F 2201/805; G06F 2009/4557; G06F 9/45558
USPC ................................................. 714/15; 718/1
See application file for complete search history.

(56) References Cited

U.S. PATENT DOCUMENTS 5,832,484 A  11/1998 Sankaran
7,680,919 B2  3/2010 Nelson
(Continued)

OTHER PUBLICATIONS

Do, Stephen M., "Office Action", U.S. Appl. No. 14/752,652, mailed Sep. 1, 2016, 33 pages.
(Continued)

*Primary Examiner* — John Chavis

(57) ABSTRACT

Examples perform live migration of VMs from a source host to a destination host using destructive consistency breaking operations. The disclosure makes a record of a consistency group of VMs on storage at a source host as a fail-back in the event of failure. The source VMs are live migrated to the destination host, disregarding consistency during live migration, and potentially violating the recovery point objective. After live migration of all of the source VMs, consistency is automatically restored at the destination host and the live migration is declared a success.

20 Claims, 7 Drawing Sheets

(56) References Cited

U.S. PATENT DOCUMENTS

| | | |
|---|---|---|
| 8,335,899 B1 | 12/2012 | Meiri |
| 8,402,200 B2 * | 3/2013 | Hwang .................. G06F 9/461 |
| | | 711/154 |
| 8,407,182 B1 | 3/2013 | Rajaa |
| 8,527,990 B1 | 9/2013 | Marathe |
| 8,875,134 B1 | 10/2014 | van der Goot |
| 8,954,408 B2 | 2/2015 | Dudgeon |
| 8,966,211 B1 | 2/2015 | Arnon |
| 9,043,640 B1 | 5/2015 | Havemose |
| 9,081,842 B1 | 7/2015 | Natanzon |
| 9,201,802 B1 | 12/2015 | Armangau |
| 9,201,887 B1 * | 12/2015 | Earl .................. G06F 17/30088 |
| 9,251,004 B1 | 2/2016 | Havemose |
| 2004/0047466 A1 | 3/2004 | Feldman |
| 2004/0247295 A1 | 12/2004 | Nam |
| 2005/0289143 A1 | 12/2005 | Oshri |
| 2007/0168284 A1 | 7/2007 | Factor |
| 2008/0065902 A1 | 3/2008 | Spohrer |
| 2008/0127182 A1 | 5/2008 | Newport |
| 2008/0137837 A1 | 6/2008 | Patel |
| 2009/0063751 A1 | 3/2009 | Dow |
| 2009/0113151 A1 | 4/2009 | Teranishi |
| 2010/0064144 A1 | 3/2010 | Kaabouch |
| 2010/0281273 A1 | 11/2010 | Lee |
| 2011/0099318 A1 | 4/2011 | Hudzia |
| 2011/0321041 A1 | 12/2011 | Bhat |
| 2012/0233285 A1 * | 9/2012 | Suzuki .................. G06F 9/4856 |
| | | 709/216 |
| 2012/0284234 A1 | 11/2012 | Mashtizadeh |
| 2012/0284707 A1 | 11/2012 | Janakiraman |
| 2013/0031069 A1 | 1/2013 | Dudgeon |
| 2013/0042241 A1 | 2/2013 | Lorenc |
| 2013/0247020 A1 | 9/2013 | Fontignie et al. |
| 2013/0262801 A1 * | 10/2013 | Sancheti .................. G06F 3/065 |
| | | 711/162 |
| 2013/0290661 A1 | 10/2013 | Reuther |
| 2014/0068127 A1 | 3/2014 | Baron |
| 2014/0115161 A1 | 4/2014 | Agarwal |
| 2014/0136803 A1 * | 5/2014 | Qin ........................ G06F 3/065 |
| | | 711/162 |
| 2014/0189672 A1 | 7/2014 | Raundahl Gregersen et al. |
| 2014/0229697 A1 | 8/2014 | Colbert |
| 2014/0282536 A1 | 9/2014 | Dave |
| 2014/0310800 A1 | 10/2014 | Kabra |
| 2014/0344395 A1 | 11/2014 | Alexander |
| 2015/0074453 A1 | 3/2015 | Fleming et al. |
| 2015/0178108 A1 | 6/2015 | Tarasuk-Levin |
| 2015/0178109 A1 | 6/2015 | Li |
| 2015/0205542 A1 | 7/2015 | Antony |
| 2015/0212839 A1 | 7/2015 | Tsirkin |
| 2015/0254424 A1 | 9/2015 | Zehler |
| 2015/0278041 A1 | 10/2015 | Ganesan |
| 2015/0370660 A1 | 12/2015 | Pershin |
| 2015/0378831 A1 | 12/2015 | Tarasuk-Levin |
| 2015/0381723 A1 * | 12/2015 | Sancheti .................. G06F 3/065 |
| | | 709/217 |
| 2016/0055019 A1 | 2/2016 | Thakkar |
| 2016/0105378 A1 | 4/2016 | Xia |
| 2016/0110267 A1 * | 4/2016 | Earl .................. G06F 17/30088 |
| | | 714/19 |
| 2016/0191332 A1 | 6/2016 | Markley et al. |
| 2016/0224371 A1 | 8/2016 | Ramanathan |

OTHER PUBLICATIONS

Chavis, John Q., "Notice of Allowance", U.S. Appl. No. 14/752,674, mailed Jul. 20, 2016, 14 pages.

Hailu, Teshome, "Office Action", U.S. Appl. No. 14/752,635, mailed Oct. 7, 2016, 20 pages.

Chavis, John Q., "Office Action", U.S. Appl. No. 14/588,023, mailed Feb. 2, 2016, 6 pages.

Chavis, John Q., "Office Action", U.S. Appl. No. 14/587,980, mailed Jan. 15, 2016, 8 pages.

Chavis, John Q., "Office Action", U.S. Appl. No. 14/587,980, mailed Jun. 27, 2016, 9 pages.

Lui et al., "Live Virtual Machine Migration Via Asynchronous Replication and State Synchronization", Dec. 2011, 14 pages.

Chavis, John Q., "Office Action", U.S. Appl. No. 14/752,643, mailed Jul. 5, 2016, 17 pages.

Chavis, John Q., "Office Action", U.S. Appl. No. 14/587,826, mailed Jan. 13, 2016, 9 pages.

Chavis, John Q., "Notice of Allowance", U.S. Appl. No. 14/587,826, mailed Dec. 21, 2016, 19 pages.

Chavis, John Q., "Notice of Allowance", U.S. Appl. No. 14/752,674, mailed Jan. 31, 2017, 13 pages.

* cited by examiner

USING A RECOVERY SNAPSHOT DURING LIVE MIGRATION

CROSS-REFERENCE TO RELATED APPLICATIONS

This application claims the benefit of U.S. Provisional Patent Application Ser. No. 62/146,180, filed Apr. 10, 2015 entitled "Asynchronous Encryption and Decryption During Live Migration", U.S. Provisional Patent Application Ser. No. 62/018,582, filed Jun. 28, 2014 entitled "Live Migration with Pre-Opened Shared Disks", U.S. Provisional Patent Application Ser. No. 62/041,047, filed Aug. 23, 2014 entitled "Live Migration of Virtual Machines with Memory State Sharing", U.S. Provisional Patent Application Ser. No. 62/041,626, filed Aug. 23, 2014 entitled "Using Active/Passive Replicated Storage for Live Migration", and U.S. Provisional Patent Application Ser. No. 62/018,580, filed Jun. 28, 2014 entitled "Using Active/Active Asynchronous Replicated Storage for Live Migration", all of which are incorporated by reference herein in their entireties.

This application is a continuation-in-part of U.S. patent application Ser. No. 14/587,980, filed Dec. 21, 2014 entitled "Live Migration with Pre-Opened Shared Disks", U.S. patent application Ser. No. 14/587,826, filed Mar. 25, 2015 entitled "Live Migration of Virtual Machines with Memory State Sharing", and U.S. patent application Ser. No. 14/588,023, filed Dec. 31, 2014 entitled "Using Active/Active Asynchronous Replicated Storage for Live Migration", all of which are incorporated by reference herein in their entireties.

This application is related to commonly-owned U.S. Non-Provisional Patent Applications entitled "Using Active/Passive Asynchronous Replicated Storage for Live Migration", "Using a Delta Query to Seed Live Migration", "Maintaining Consistency Using Reverse Replication During Live Migration", and "Asynchronous Encryption and Decryption of Virtual Machine Memory for Live Migration", filed concurrently herewith, all of which are incorporated by reference herein in their entireties.

SUMMARY

Examples of the present disclosure perform consistency-breaking operations when live migrating a consistency group (CG) of a plurality of virtual machines (VMs) from storage associated with a source host to a destination host. In some examples, live migration is performed on another source object, such as a process, container, or the like. The present disclosure takes a snapshot of the CG before initiating live migration, and upon a failure during live migration, restores the source host to the snapshot before reinitiating live migration. The present disclosure may violate the recovery point objective (RPO), but ultimately restores the plurality of VMs to a consistent state before completing live migration.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
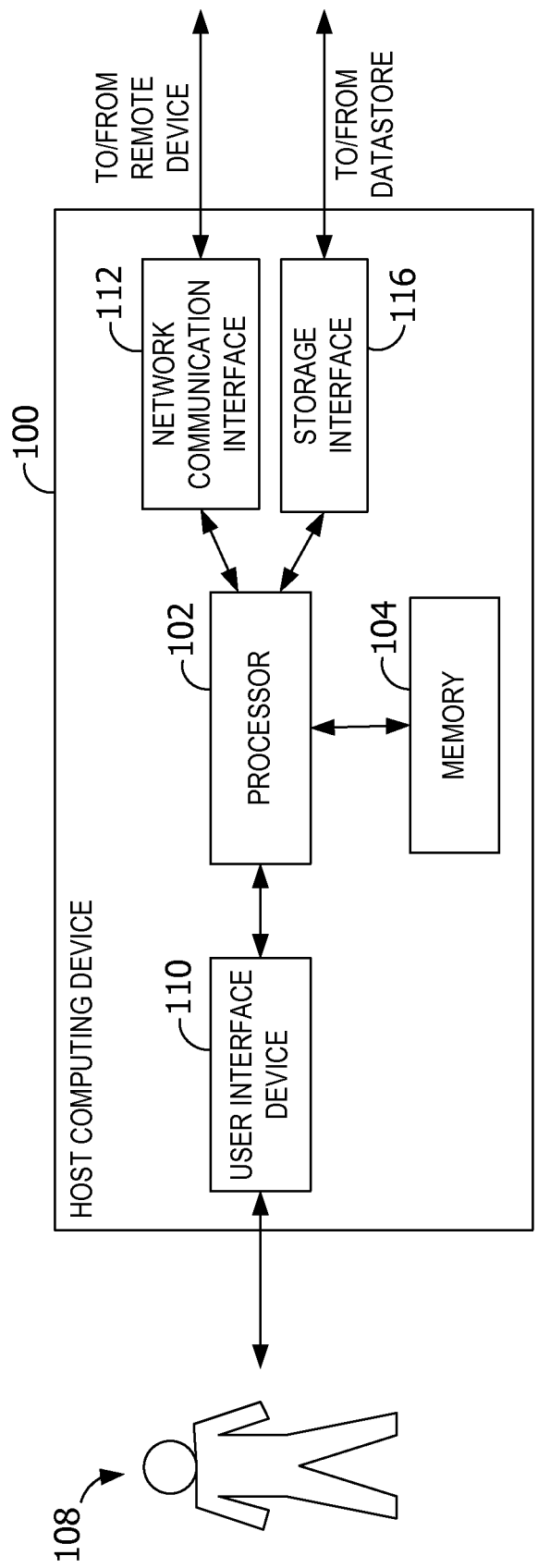
FIG. 1 is a block diagram of an exemplary host computing device.

For some systems, migrating single virtual machines (VMs) between customer datacenters is not problematic, because there is no inter-VM consistency to maintain. However, when migrating a plurality of VMs, which have inter-VM consistency requirements, migrating VMs is more problematic. As a result, in some existing systems where a CG contains multiple VM disks, the CG cannot be live migrated because the VMs are still running at the source datacenter, and will need to continue execution and writing to the source side of the CG. As a result, many processes require that the VMs stop running during migration. Copying the disk content (e.g., pages) of a source VM can be a time-consuming process, potentially requiring hours or days and gigabytes or terabytes of customer bandwidth, resulting in unacceptable delays.

Aspects of the disclosure provide a process of live migration using destructive consistency-breaking operations in order to accelerate the live migration of a CG of source VMs. A snapshot of the CG of the source VMs on storage is created before live migration begins. The live migration of the source VMs is performed using destructive consistency-breaking operations. However, if the live migration fails, the snapshot of the CG is used as a recovery point. After the plurality of source VMs is migrated to a destination host, the consistency of the VMs is automatically restored, and the live migration is a success. Aspects of the disclosure accommodate cross-VM data consistency and the capabilities of different replication solutions. In these examples, the VM does not depend on both the source and destination to run, but exists entirely on either the source or the destination.

Although live migration of VMs is disclosed herein, live migration of any process, container, or other object with memory, including on-disk state, between sites is contemplated.

One example of containers is a container from Docker, Inc. Containers implement operating system-level virtualization, wherein an abstraction layer is provided on top of a kernel of an operating system on a host computer. The abstraction layer supports multiple containers each including an application and its dependencies. Each container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Replication

Replication copies the data associated with a VM from one location to another (e.g., from one host to another host) for backup, disaster recovery, and/or other purposes. Replication occurs every hour, nightly, continuously, etc. Replication may be described in some examples at the VM level (e.g., replication of VMs, or a subset of the disks of the VMs), such as in Host Based Replication (HBR) and/or vSphere Replication from VMware, Inc. Alternatively or in addition, replication may be described at a deeper level, with reference to logical unit numbers (LUNs), a group of LUNs in a consistency group, and/or the like. In general, aspects of the disclosure are operable with replication in which at least one host writes to a LUN (which backs one or more of the disks of a VM) on one site, with another host at another site leveraging the replicated LUN content.

There are several types of replication. In active/active replication, both hosts have access to their respective copies of the VM. That is, the active/active nature of replication ensures that both sides concurrently write to the replicated storage without issue.

Further, replication may be synchronous or asynchronous. Synchronous replication requires round-trips on the write path, whereas asynchronous replication does not. Each party, in some examples, may freely write to disk. Aspects of the disclosure are operable with any mechanism (e.g., locking, generation number tracking, etc.) to ensure that one may, in a distributed manner, determine where the latest version of any given item of data is stored.

Live Migration

Some existing systems migrate VMs from a source host computing device to a destination host computing device while both devices are operating. For example, the vMotion process from VMware, Inc. moves live, hot, running, or otherwise executing VMs from one host to another without any perceptible service interruption.

As an example, a source VM hosted on a source server is migrated to a destination VM on a destination server without first powering down the source VM. After optional pre-copying of the memory of the source VM to the destination VM, the source VM is suspended and its non-memory state is transferred to the destination VM; the destination VM is then resumed from the transferred state. The source VM memory is either paged in to the destination VM on demand, or is transferred asynchronously by pre-copying and write-protecting the source VM memory, and then later transferring only the modified pages after the destination VM is resumed. In some examples, the source and destination servers share common storage, in which the virtual disk of the source VM is stored. This avoids the need to transfer the virtual disk contents. In other examples, there is no shared storage. The lack of shared storage implies the need to copy, or otherwise make disk content available at the destination host. Also, some live migration schemes guarantee that page-in completes prior to the VM resuming execution at the destination host.

With the advent of virtual volumes (e.g., Vvols) and virtual storage array networks (vSANs), object-backed disks are now supported for live migration. In some examples, disks are file extents on a VM file system (VMFS) or network file system (NFS), with disk open commands requiring little more than simply opening the flat files and obtaining locks. With virtual volumes and vSANs, however, opening a disk is far more complex. For example, the host must call out to an external entity (e.g., a vendor provider) to request that the particular object be bound to the host. A number of other calls flow back and forth between the host and VP to prepare and complete the binding process. Only after that communication finishes may the lock be acquired on the disk. The disk open is then declared to have completed successfully.

In systems in which active/active synchronous replication is configured between a source host and a destination host, the live migration process for a VM from the source host to the destination host is modified to omit the disk copy phase of the live migration as both the source and destination hosts both have access to up-to-date versions of the disk content of the VM, as described herein. As such, no disk or configuration content copying is performed. Instead, a handoff of ownership of the VM is performed from the source host to the destination host.

Consistency Groups

For replication, volumes associated with a VM may be placed in consistency groups (CGs) on storage to ensure that writes to those volumes are kept write order consistent. This ensures that the entire CG is replicated consistently to a remote site. For example, if the replication link goes down, the entire write replication stream halts, ensuring that the CG at the remote site is still self-consistent. Such consistency is important when the data files of a VM are on different volumes from its log files, which is a typical scenario for performance reasons. Many commercial databases use the write ahead logging (WAL) protocol. With WAL, database crash recovery is always possible, since all updates are first durably written to the log before they are written to the data file. Utilizing CGs ensures that write order consistency is preserved. Without maintaining write order consistency, it may be possible that data corruption could occur, resulting in an unrecoverable database, which may lead to a catastrophic loss of data.

In some examples, cross-VM or cross-volume consistency is desired to be maintained. For instance, if a user is operating multiple VMs that are writing to the same disk volumes, or if multiple VMs are interacting, all write order consistency requirements are met to avoid the possibility of data corruption.

In active/passive storage environments, the source and destination cannot concurrently write to the storage disks, because one site has access only to the read-only or passive replica as guaranteed by the replication solution (e.g., only one site or the other will ever attempt to write to the disk content of a VM). In other examples, different arrays may support different techniques. However, depending on whether a single VM is moved, or multiple VMs, there may be problems with cross-VM write order consistency. For example, data may be replicated from the source VM to the destination VM, but the replicated data may depend on other, unreplicated data. In this example, write order consistency is not maintained.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks 334, solid state disks 334, and/or optical disks 334. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
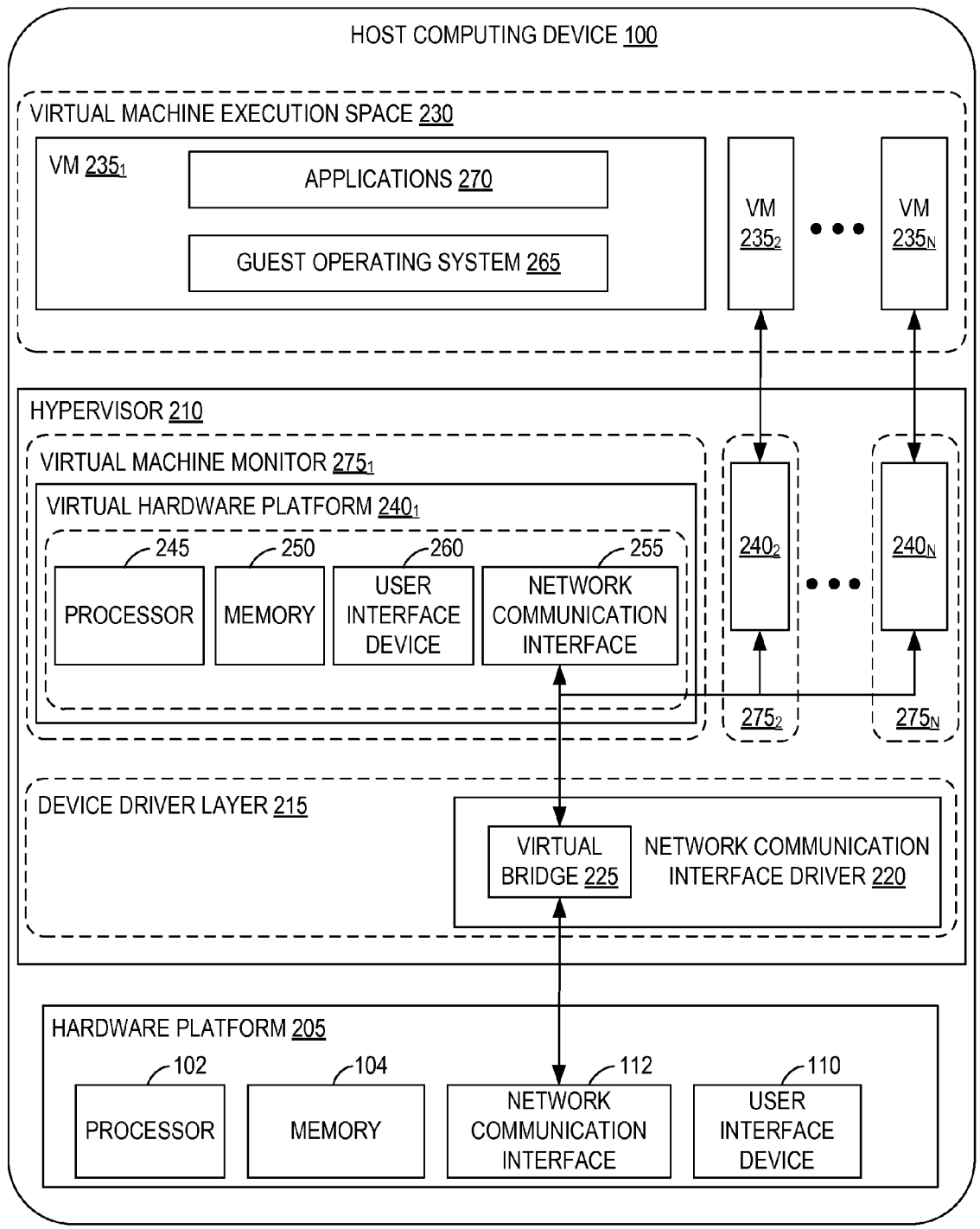
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210 210, is installed on top of hardware platform 205.

The virtualization software layer supports a virtual machine execution space 230 within which multiple virtual machines (VMs $235_1$-$235_N$) may be concurrently instantiated and executed. Hypervisor 210 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM 2350. Hypervisor 210 210 may manage (e.g., monitor, initiate, and/or terminate) execution of VMs $235_1$-$235_N$ according to policies associated with hypervisor 210 210, such as a policy specifying that VMs $235_1$-$235_N$ are to be automatically restarted upon unexpected termination and/or upon initialization of hypervisor 210 210. In addition, or alternatively, hypervisor 210 210 may manage execution VMs $235_1$-$235_N$ based on requests received from a device other than host computing device 100. For example, hypervisor 210 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210 210. One example of hypervisor 210 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor 102 and a memory area. The processor 102 includes any quantity of processing units, and is programmed to execute computer-executable instructions for implementing aspects of the disclosure. The instructions may be performed by the processor 102 or by multiple processors 102 executing within the computing device, or performed by a processor 102 external to computing device. In some examples, the processor 102 is programmed to execute instructions such as those illustrated in the figures.

The memory area includes any quantity of computer-readable media associated with or accessible by the computing device. The memory area, or portions thereof, may be internal to the computing device, external to computing device, or both.

Figure 3:
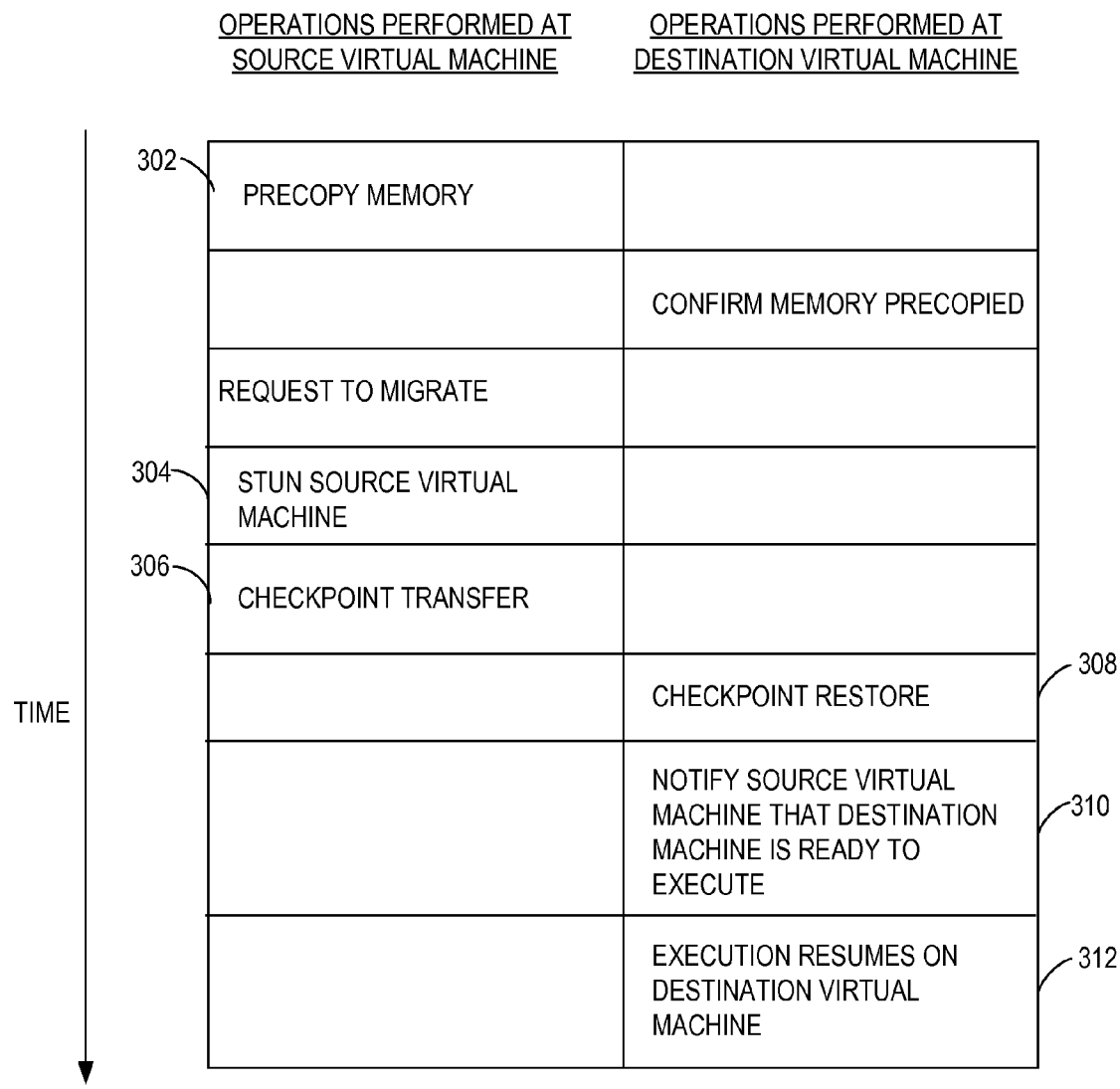
FIG. 3 is an exemplary sequence of live migration as performed by a source VM and a destination VM.

FIG. 3 is an exemplary sequence of live migration of disk contents as performed by a source VM 406 and a destination VM 426. The live migration operations for the source VM 406 and the destination VM 426 are sequentially ordered. At 302, the memory of the source VM 406 on a source host 402 is precopied. Contents of a storage disk 434 of the source VM 406 which are already present on the destination VM 426 are not copied.

After the source VM 406 is stunned at 304, the virtual device state of the source VM 406 on the source host 402 is serialized, and its storage disks 434 are closed (e.g., VM file systems, logical unit numbers, etc.) and its exclusive disk locks are released at 306. These operations are often collectively referred to as a "checkpoint transfer". The virtual device state includes, for example, memory, queued input/output, the state of all virtual devices of the VM, and any other virtual device side memory. More generally, operation 306 may be described as preparing for disk close.

At this point in the timeline, the destination VM 426 prepares disks for access. For example, the destination VM 426 executes a checkpoint restore at 308. The checkpoint restore includes opening the storage disks 434 and acquiring exclusive disk locks. Restoring the virtual device state includes applying checkpoints (e.g., state) to the destination VM 426 to make the destination VM 426 look like the source VM 406. Once the checkpoint restore is complete, the destination VM 426 informs the source VM 406 that the destination VM 426 is ready to execute at 310. Some examples contemplate a one-way message sent from the destination VM 426 to the source VM 406 informing the source VM 406 that the destination VM 426 is ready to execute. This one-way message is sometimes referred to as a Resume Handshake. The execution of the VM may then resume on the destination VM 426 at 312.

With virtual volumes, on the source host, the disks are changed to multi-writer access, then pre-opened (also in multi-writer mode) on the destination host. The checkpoint state is then transferred and restored without closing the disks and opening them on the other side, then the VM is resumed on the destination side, the disks are closed on the source side, and access is reverted to "exclusive read/write" mode on the destination side. In this manner, the disk open/close time is removed from between the checkpoint transfer and restore, thus shortening the combined time of those two operations and reducing the amount of time the VM is suspended (e.g., not running on either host).

Figure 4:
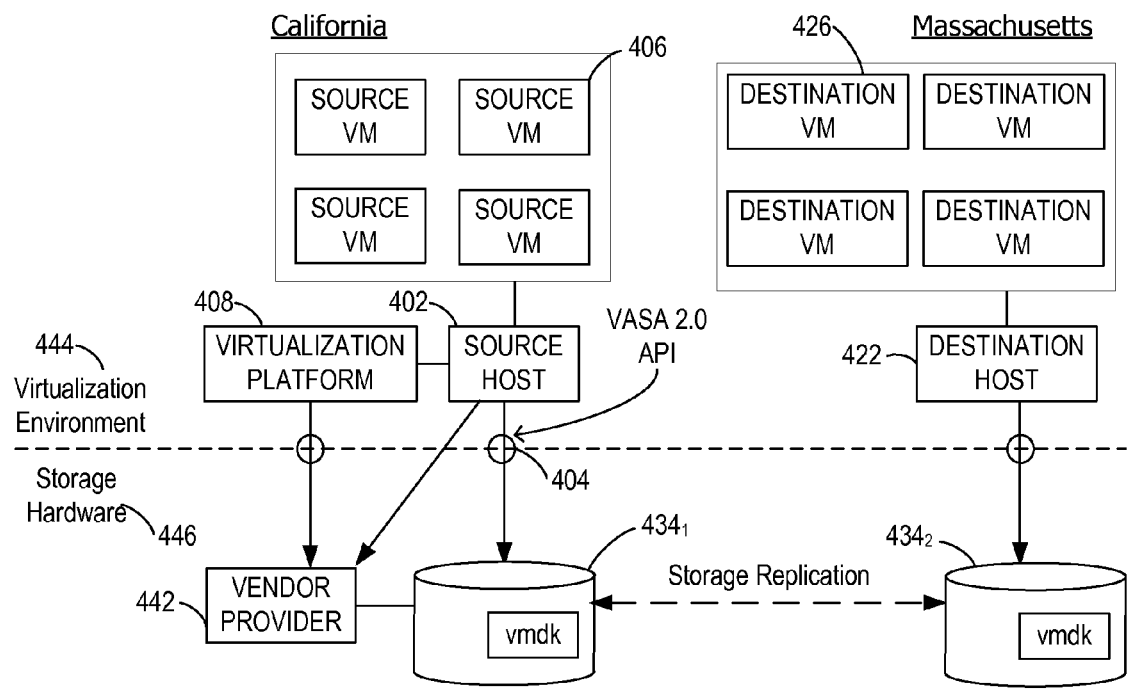
FIG. 4 is a block diagram of a system utilizing consistency-breaking techniques for live migration of a source VM to a destination VM, including the source and destination VMs, the network, and the disks.

FIG. 4 is a block diagram of a system utilizing reverse replication during live migration of the source VM 406 to the destination VM 426, such as when the underlying disks are managed by a vendor provider (VP) 442. In general, the system may include the source host 402 and a destination host 422. Each host may contain a processor and a memory area (not illustrated). One or more VMs may be contained within the memory area of each host. In the example of FIG. 4, the source host 402 is located in California and the destination host 422 is located in Massachusetts; however, the hosts may be located anywhere. In some examples, the source host 402 and destination host 422 communicate directly with each other. The source host 402 and destination host 422 also communicate with their respective storage disks 434, such as storage disk $434_1$ and storage disk $434_2$, respectively, through an application programming interface (API) 404. The storage disks 434 may be one of any number of examples that are locally or remotely accessible, including a virtual storage array, NFS, VMFS, virtual volume (e.g., virtual volume 922), and vSAN. The storage disks may be accessible through a network. In some examples, such as in FIG. 5, the storage disks 434 are managed by the VP 442.

Collectively, a virtualization platform 408, the source VM 406 and destination VM 426, and the source host 402 and destination host 422 may be referred to as a virtualization environment 444. The APIs 404 represent the interface between the virtualization environment 444 and storage hardware 446. The storage hardware 446 includes the VP 442 and the storage disks 434 of the source VM 406 and the destination VM 426.

In the example of FIG. 4, a plurality of source VMs 406 are located on the source host 402, and a plurality of destination VMs 426 are located on the destination host 422.

The source host 402 and destination host 422 communicate directly, in some examples. In other examples, the source host 402 and destination host 422 communicate indirectly through the virtualization platform 408. Storage disks 434, in the illustrated example, are managed by VPs 442, or other array providers, that allow shared access to the storage disks 434 (e.g., virtual volumes such as virtual volume 922). The storage disks 434 illustrated in FIG. 4 are maintained by one of the VPs 442. In this example, the source host 402 and destination host 422 communicate with the storage disks 434 through a network (not illustrated).

Figure 5:
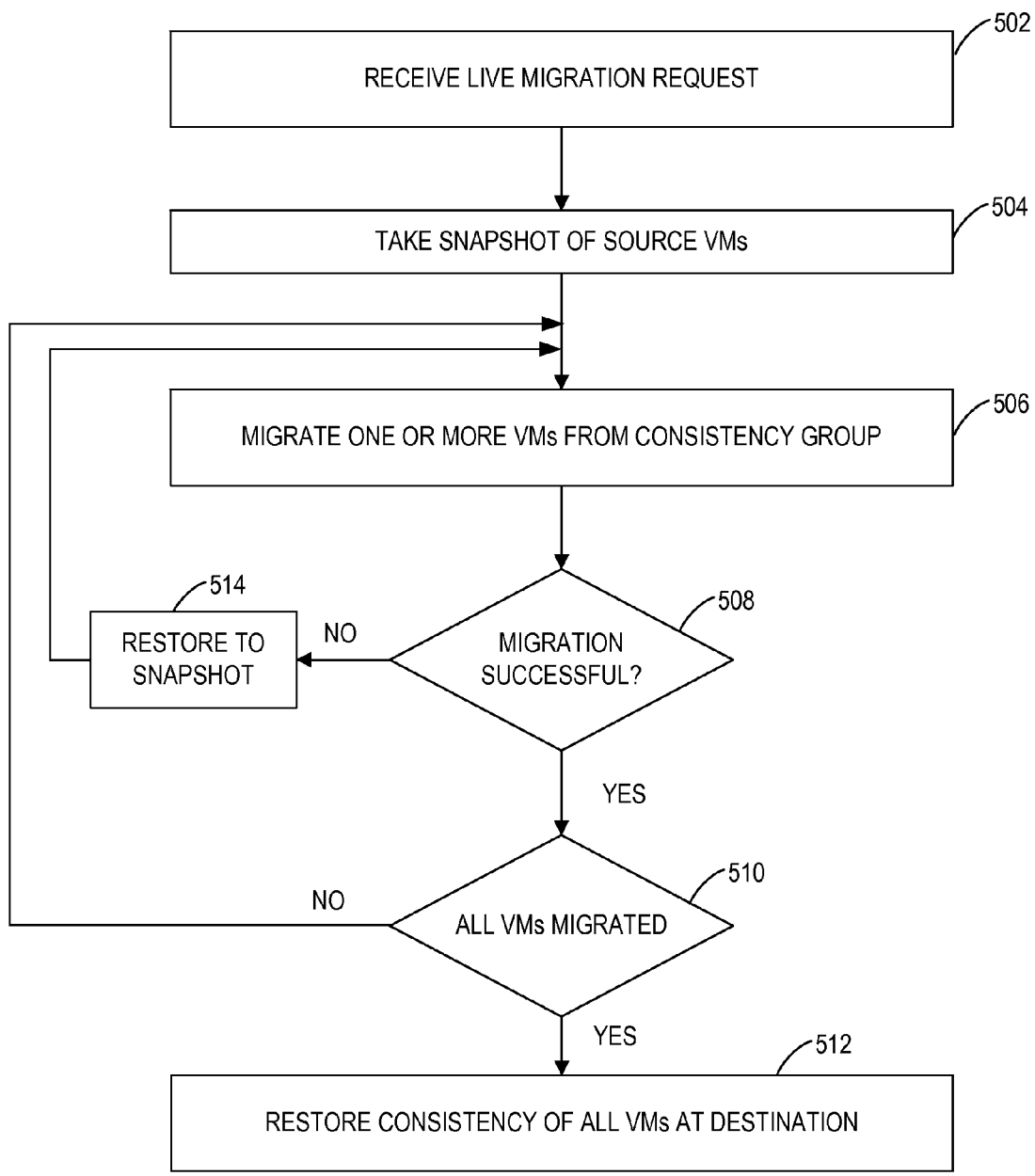
FIG. 5 is a flowchart of an exemplary method consistency breaking technique live migration of a VM from a source VM to a destination VM.

FIG. 5 is a flowchart of an exemplary method of consistency breaking live migration of a CG of a plurality of VMs from the storage associated with the source host 402 to the storage associated with the destination host 422, as performed by the hypervisor 210. While method 500 is described with reference to execution by a processor, or a hypervisor contained on the source host 402, it is contemplated that method 500 may be performed by any computing device. Further, execution of the operations illustrated in FIG. 5 is not limited to a VM environment, but is applicable to any multi-source, multi-destination environment. Additionally, while the claim language is drawn to migration of a plurality of VMs from a host to a destination, it is understood that the method may likewise be utilized for migration of a single VM. Also, one or more computer-readable storage media storing computer-executable instructions may execute to cause a processor to implement the live migration by performing the operations illustrated in FIG. 5.

Figure 6:
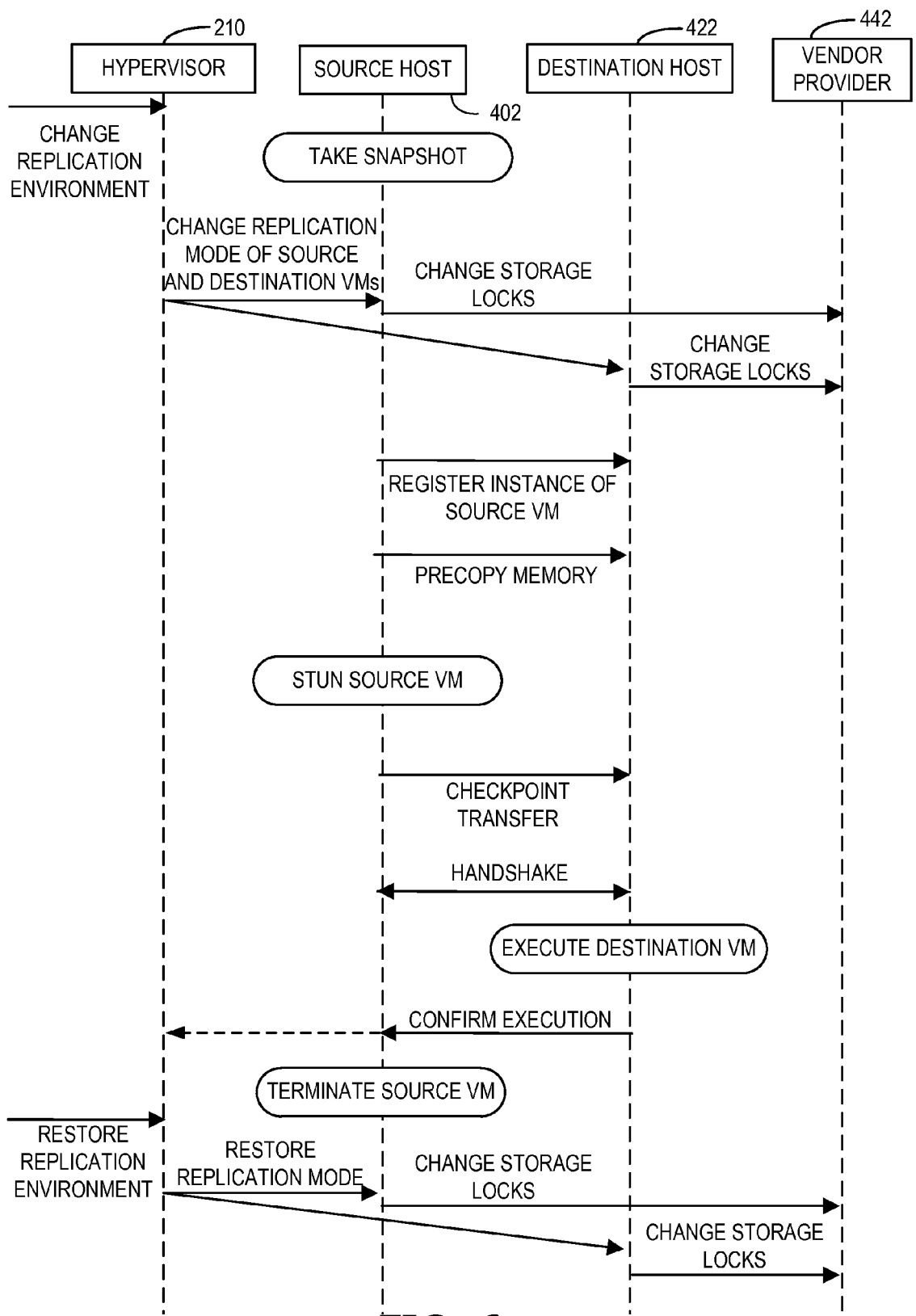
FIG. 6 is a flowchart of a sequence diagram illustrating the interaction between the source VM, destination VM, and the storage provider managing virtual volumes during live migration with consistency breaking.

The operations of the exemplary method of 500 are carried out by a processor associated with the source VM 406. The hypervisor 210 coordinates operations carried out by the processors associated with the source host 402 and destination host 422 and their associated VMs. FIG. 6, described below, illustrates the sequence of the following events.

At 502, a request is received to perform live migration between the source host 402 and the destination host 422. The request may initiate from the hypervisor 210, from user 108, or may be triggered by an event occurring at the source VM 406. For example, the triggering event may be a request by user 108 for live migration from the source host 402 to the destination host 422. In other examples, the triggering event is the source VMs 406 or source host 402 reaching some operational threshold (e.g., the source VMs 406 begin to exceed the resources of the source host 402, and are to be migrated to the destination host 422 with higher performance capabilities). As further examples, the source VMs 406 are live migrated for backup purposes, in order to make it more accessible to a different user 108. Requests for live migration are, in some examples, periodic, or otherwise occurring at regular intervals. In other examples, requests for live migration are made during system downtime, when I/O commands fall below a threshold amount established, for instance, by users 108. In other examples, requests for live migration are in response to system conditions such as anticipated hardware upgrades, downtimes, or other known or predicted hardware or software events.

At 504, a snapshot of the consistency group (CG) of the source VMs 406 on storage is created. In the event of a failure during live migration of the CG, the source VMs 406 are restored using the snapshot of the CG (e.g., recovery CG or RCG). At 506 migration begins. A single source VM 406 is migrated at a time, in some examples. In other examples, the source VMs 406 are migrated in parallel. The process of migrating a single source VM 406 is illustrated and described in more detail in FIG. 6, below. As the source VMs 406 are migrated from the source host 402 to the destination host 422, destructive consistency-breaking operations are, in some examples, performed. For instance, write-order consistency is not maintained as the source VMs 406 are pre-copied.

At 508, if the migration of the single source VM 406 was successful, the next source VM 406 is migrated, until all of the source VMs 406 are migrated to the destination host 422. In some examples, the migration of the source VMs is not performed one at a time, but rather they are migrated in parallel, or in accordance with the write log, or in any manner known in the art. If the migration of the single source VM 406 was unsuccessful, or in some examples if a portion of the live migration was unsuccessful, then the source host 402 is restored to its pre-migration status, and migration begins again. This process may violate the recover point objective (RPO) of the system. However, despite violating the RPO the consistency of the CG will ultimately be maintained. In some examples, if one or more single source VMs 406 are successfully migrated and the live migration subsequently fails, the successfully migrated source VMs 406 are not migrated again. In this example, the destination host 422 notifies the source host 402 upon successful migration of any source VM 406, and that source VM 406 is not migrated again.

Once all of the source VMs 406 are successfully migrated at 510, the consistency of all of the source VMs 406 is automatically restored on the destination host 422 at 512. Live migration is a success when the CG is live migrated to the storage associated with the destination host 422, which results in the CG being fully restored.

FIG. 6 is a flowchart of a sequence diagram illustrating the interaction between the hypervisor, the source host, destination host, and the storage provider managing storage disks 434 (e.g., virtual volumes 922) during live migration using reverse replication. FIG. 6 illustrates the sequence for a single source VM 406; however, the same may be repeated as necessary until all of the source VMs 406 of the CG are migrated, as illustrated in the flowchart in FIG. 5, described above.

The hypervisor 210, through the source host 402 and destination host 422, directs the source VM 406 and destination VM 426 to change their respective replication modes. In some examples, a virtualization software implementing a virtualization platform 408 or environment, such as VMware, Inc.'s VirtualCenter invokes an API, such as part of API 404 (e.g., PrepareForBindingChange( )) to notify the storage VP 442 to set up the replication environment before the live migration. For instance, in some examples in response to the request, the VP 442 switches the replication mode from active/active asynchronous to active/active synchronous (or "near synchronous" or "approximately asynchronous" in some examples). In some examples the replication mode may already be active/active asynchronous when the VP 442 issues the request. In some examples, the VP 442 also drains queued replication data I/O as necessary. This call blocks further I/O commands for as long as needed to switch the replication state to be synchronous. The PrepareForBindingChange( ) API function call, or other function call, is issued against the shared storage disk 434 of the source VM 406. Switching from asynchronous replication to synchronous replication during the live migration ensures that any writes to the source VM 406 that occur during the live migration are duplicated by the destination VM 426. Aspects of the disclosure ensure that the underlying replication solution flushes whatever writes are occurring synchronously to the replica LUN/disk/storage (e.g., storage disk 434). The destination VM 426, in some examples, does not actually issue duplicate I/O commands.

Subsequently, a snapshot is taken of the CG of the source VMs 406 on the storage associated with the source host 402. The snapshot of the CG, also known as a Recovery CG or RCG, is a safe fail back point if the live migration of the source VMs 406 is unsuccessful. Additionally, in some examples the RCG is used to ensure that write-order consistency is restored to the CG of the source VMs 406 at the destination host 422.

In response to the command to change their replication modes, and with the workload of the source VM 406 still running, the source VM 406 instructs the VP 442 to downgrade its disk locks from exclusive locks to multiwriter disk locks, or other shared disk locks. In another example, the disk locks are downgraded to an authorized user status. The authorized users are established as the source VM 406 and the destination VM 426. This step is omitted in the event that there are no locks on the disks 434. The destination VM 426, in response to the direction to change its replication mode, binds and opens all VM disks 434 in multiwriter lock mode. In some examples, the source VM 406 sends a message to the destination VM 426 that multiwriter mode is available for the disks 434 to be migrated. In some examples, the destination VM 426 is instructed not to write to the disks 434.

The source VM 406 then registers an instance of itself at the destination. In order to register the source VM 406, the source VM 406 shares its configuration, including information regarding its disks 434. For example, the new instance of the source VM 406, registered at the destination host 422, points to the replicated read-only disk content on the disk 434 of the source VM 406.

After the source VM 406 is registered at the destination host 422, the newly created destination VM 426 binds and opens all disks 434 in non-exclusive mode (e.g., multiwriter) lock mode. The memory of the source VM 406 is pre-copied from the source host 402 to the destination host 422. For example, ESXi servers, using the vMotion network, pre-copy the memory state of the source VM 406. This may take anywhere from seconds to hours. Pre-copying is complete when the memory at the destination VM 426 is approximately the same as the memory at the source VM 406. Any form of memory copy is contemplated. The disclosure is not limited to pre-copy. Further, the memory copy may be performed at any time, even post-switchover (e.g., after the destination VM 426 is executing and the source VM 406 has terminated). Only memory which is not already present at the destination host 422 is copied.

After the source VM 406 is precopied, the source VM 406 is stunned, frozen, or otherwise suspended. Stunning freezes or otherwise suspends execution of the source VM 406, but does not quiesce the source VM 406, in some examples. For example, no cleanup or shutdown operations normally associated with quiescing are performed. The duration of the suspended execution, in some examples, is about one second. Several operations may be performed during this duration or interval:

A. Any remaining dirty memory state is transferred from the source VM 406 to the destination VM 426. This may be performed as part of a checkpoint transfer, at 516.

B. The destination VM deserializes its virtual device checkpoint (e.g., checkpoint restore).

Once stunned, the virtual device state of the source VM 406 is serialized for transmission to the destination VM 426. Serializing the virtual device state of the source VM 406 on the source host 402, in some examples, includes closing disks 434 (e.g., VM file systems, logical unit numbers, etc.) and releasing exclusive disk locks. These operations are often collectively referred to as checkpoint transfer. The virtual device state includes, for example, memory, queued input/output, the state of all virtual devices of the source VM 406, and any other virtual device side memory. There is no need to close any disks 534 here.

Upon receipt of the information in the checkpoint transfer, the destination VM 426 engages in a checkpoint restore. For example, the destination VM 426 restores the virtual device state of the source VM 406 at the destination VM 426, once the VP 442 indicates that the disks 434 have been opened successfully in multiwriter mode for the destination VM 426. However, there is no need to open the disks 434 at this point because that occurred earlier.

In some examples, the destination VM 426 then transmits an explicit message to the source VM 406 that the destination VM 426 is ready to start executing. The source VM 406, in this example, replies with a Resume Handshake. In other examples, the source VM 406 sends a message to the destination VM 426 confirming receipt of the message from the destination VM 426. In another example, the processor queries and updates both the source and the destination VMs for status reports regarding the checkpoint transmission and restoration.

After receiving that acknowledgement from the source VM 406, the destination VM 426 begins executing. In some examples, after the start of execution, the destination VM 426 sends a confirmation to the source VM 406 that execution has begun successfully. In response to receiving confirmation that the destination VM 426 has begun execution, the source VM 406 closes (e.g., terminates), which includes releasing its multiwriter disk locks. The destination VM 426, with the workload already running and issuing disk input/output (I/O), transparently upgrades its locks from multiwriter to exclusive ownership.

Following termination, the destination host 422 begins continuously intercepting any I/O writes made to the migrated source VM 406. The destination host transmits the I/O writes back to the source host 402, where the I/O writes are made to the CG of the plurality of source VMs 406.

This process is repeated for as many source VMs 406 as are remaining to migrate to the destination host 422. After all of the source VMs 406 are successfully migrated, the consistency of the CG is automatically restored. The hypervisor 210, after termination of the source VM 406 at the source host 402, receives the command to restore the original replication environment, and the hypervisor 210 directs the source VM 406 and destination VM 426 to return to their original replication mode, for instance active/active asynchronous replication mode. The process of cleanup occurs. This includes VirtualCenter invoking another of APIs 404 (e.g., CompleteBindingChange( )) that allows the storage vendor to reverse any changes to the environment which, in some examples, were made above. For example, the VP 442 reverts replication to operating asynchronously (e.g., active/active asynchronous), and may change replication direction or bias and restore an original recovery point objective (RPO).

In some examples, API 404 is used to reverse the direction of replication. The source and destination VM reverse roles, with the source VM 406 becoming the replication target, while the destination VM 426 is now the read-write replication source. VM downtime or switchover time refers to the time a VM is not executing guest instructions during the live migration (e.g., between stunning the source VM and resuming/beginning execution of the destination VM).

Figure 7A:
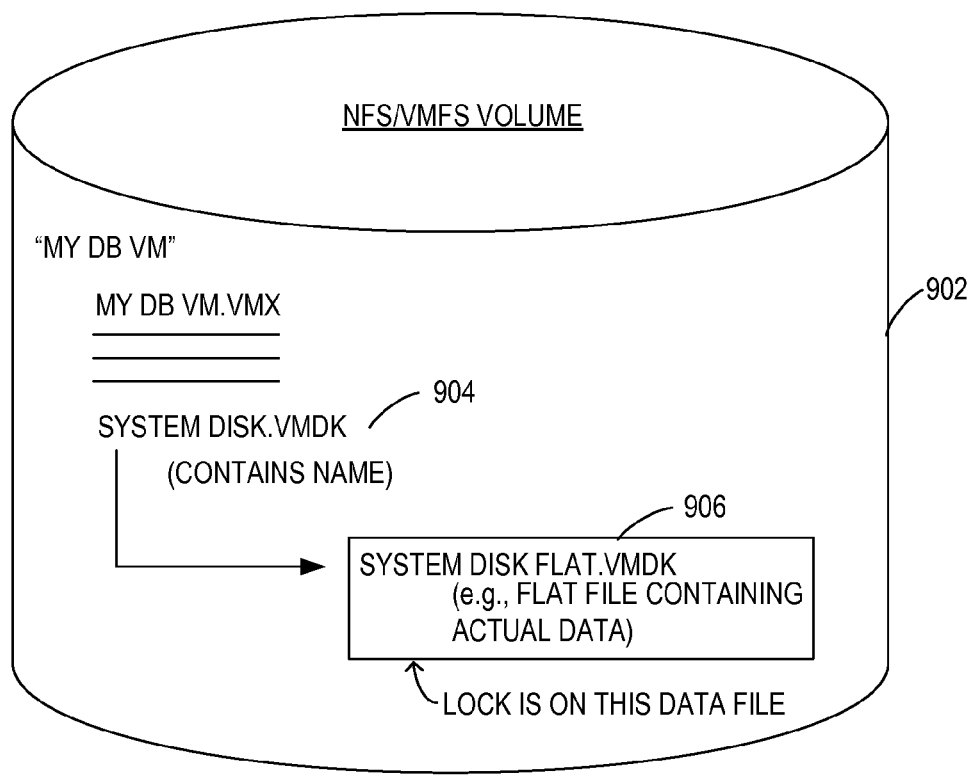
FIG. 7A is a block diagram of an exemplary disk lock structure for a network file system (NFS) or virtual machine file system (VMFS).
Figure 7B:
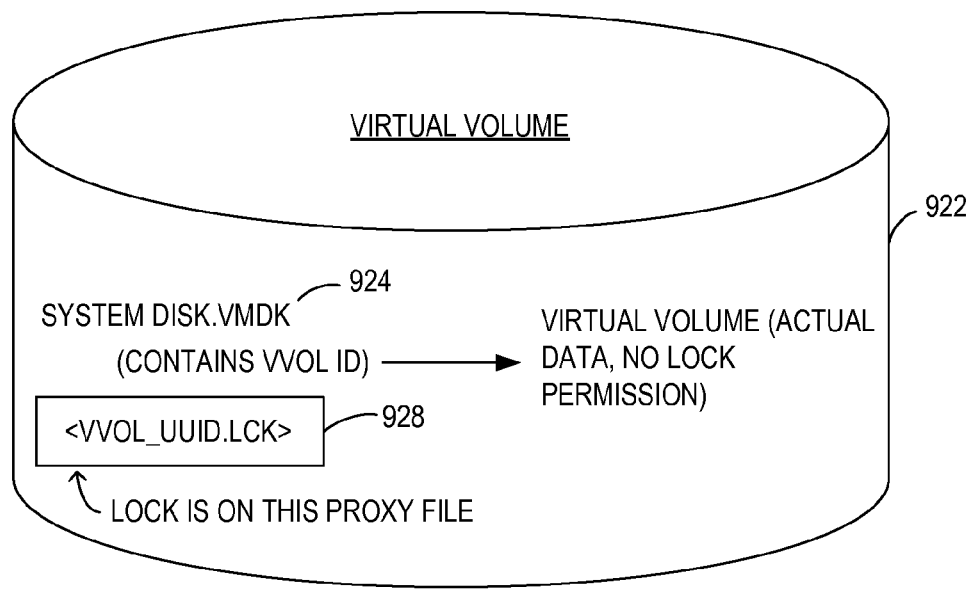
FIG. 7B is a block diagram of an exemplary disk lock structure for a virtual volume (VVOL).

FIG. 7A is a block diagram of an exemplary disk lock structure for a network file systems (NFSs) or virtual machine file systems (VMFSs) 902. FIG. 7B is a block diagram of an exemplary disk lock structure for a virtual volume (VVOL) 922. Depending on the type of disk associated with the host VM 235, the locking mechanism may be downgraded by the host in a different manner.

Aspects of the disclosure present a live migration scheme that accommodates VMs having numerous disks 434 and accounts for longer switchover time for opening/closing those disks 434. In some examples, disk operations are performed while the source VM 406 is still running, which keeps the switchover time to a minimum. For example, rather than sequentially providing access to disks 434 involved in a live migration, aspects of the disclosure overlap shared access to the disks 434 (e.g., by the source VM 406 and the destination VM 426) to move expensive disk operations outside the downtime window. Even though both the source VM 406 and the destination VM 426 share a writeable state to the disks 434, at least the destination VM 426 is prevented from writing to these disks 434 while sharing access. In some examples, the source VM 406 is also prevented from writing to these disks 434 at this time. This prevents corruption of the disks 434 and prevents the introduction of inconsistencies in the disks 434.

Shared access to the disks 434 may be implemented by shared disk locks and/or multiwriter locking. For instance, locking is fundamentally different in virtual volumes 922 versus NFSs or VMFSs 902. In NFS/VMFS 902, a systemdisk.vmdk 904 contains the name of the system, and it points to a flat file 906. The locks are placed on the flat file 906 itself (e.g., the extent).

For virtual volumes 922, a systemdisk.vmdk 924 contains a VVOL_ID which points to the virtual volume 922 backend and to a VVOL_UUID.lck file (e.g., the lock file) 928. UUID refers to universal unique identifier. For virtual volumes 922, the lock is not on the backend data itself (which has no lock primitives), but instead on a proxy file (e.g., the VVOL_UUID.lck file 928).

As described herein, the destination VM 426 opens disks 434 prior to the source VM 406 being stunned (e.g., the destination VM 426 pre-opens the disks 434), with the destination VM 426 taking exclusive ownership of the disks 434 by the completion of the migration. However, it is also possible that the disks 434 associated with the system are not locked. While some examples are described herein with reference to shared disk locks, .lck files, and the like, the disclosure contemplates any form of shared disks 434—with or without locks. Some examples do not take any locks against the disks 434 (e.g., virtual volume 922 .lck files) and/or do not create new .lck files for the destination VM 426. In these examples, the disclosure is operable with shared disks 434, but unshared disk locks (e.g., there are no disk locks). Aspects of the disclosure are operable with any mechanism for taking exclusive ownership of the disk and/or any mechanism allowing the destination VM 426 to open the disks 434.

Each virtual volume 922 is provisioned from a block based storage system. In an example, a NAS based storage system implements a file system on top of data storage units (DSUs) and each virtual volume 922 is exposed to computer systems as a file object within this file system.

In general, virtual volumes 922 may have a fixed physical size or may be thinly provisioned, and each virtual volume 922 has a VVOL_ID (identifier), which is a universally unique identifier that is given to the virtual volume 922 when the virtual volume 922 is created. For each virtual volume 922, a virtual volume database stores, for each virtual volume 922, the VVOL_ID, the container ID of the storage container in which the virtual volume 922 is created, and an ordered list of <offset, length> values within that storage container that comprise the address space of the virtual volume 922. The virtual volume database is managed and updated by a volume manager, which in one example, is a component of a distributed storage system manager. In one example, the virtual volume database also stores a small amount of metadata about the virtual volume 922. This metadata is stored in the virtual volume database as a set of key-value pairs, and may be updated and queried by computer systems via an out-of-band path at any time during existence of the virtual volume 922. Stored key-value pairs fall into three categories, in some examples. One category includes well-known keys, in which the definition of certain keys (and hence the interpretation of their values) are publicly available. One example is a key that corresponds to the virtual volume type (e.g., in virtual machine examples, whether the virtual volume 922 contains the metadata or data of a VM 235). Another example is the App ID, which is the ID of the application that stored data in the virtual volume 922.

Another category includes computer system specific keys, in which the computer system or its management module stores certain keys and values as the metadata of the virtual volume. The third category includes storage system vendor specific keys. These allow the storage system vendor to store certain keys associated with the metadata of the virtual volume. One reason for a storage system vendor to use this key-value store for its metadata is that all of these keys are readily available to storage system vendor plug-ins and other extensions via the out-of-band channel for virtual volumes 922. The store operations for key-value pairs are part of virtual volume creation and other processes, and thus the store operation are reasonably fast. Storage systems are also configured to enable searches of virtual volumes based on exact matches to values provided on specific keys.

Additional Examples

Some examples contemplate the source host and/or the destination host being associated with a hybrid cloud service (e.g., a public-private cloud). A hybrid cloud service, such as vCloud Air by VMware, Inc., is a public cloud platform allowing seamless transition between a private cloud and a public cloud.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for performing live migration leveraging replication. For example, the elements illustrated in the figures, such as when encoded to perform the operations illustrated in the figures, constitute exemplary means for changing a replication mode from active/active asynchronous to active/active synchronous in response to receiving a request to perform a live migration of a source VM on a source host to a destination VM on a destination host, exemplary means for performing the live migration of the source VM to the destination VM, and exemplary means for changing the replication mode from active/active synchronous to active/active asynchronous after completion of the live migration.

At least a portion of the functionality of the various elements illustrated in the figures may be performed by other elements in the figures, or an entity (e.g., processor, web service, server, application program, computing device, etc.) not shown in the figures. For example, some examples are described herein with reference to virtual volumes, such as virtual volumes 922. According to some examples, a storage system cluster creates and exposes virtual volumes 922 to connected computer systems. Applications (e.g., VMs accessing their virtual disks, etc.) running in computer systems access the virtual volumes 922 on demand using standard protocols, such as SCSI (small computer simple interface) and NFS (network 530 file system) through logical endpoints for the SCSI or NFS protocol traffic, known as "protocol endpoints" (PEs), that are configured in storage systems.

While some of the examples are described with reference to virtual volumes 922 offered by VMware, Inc., aspects of the disclosure are operable with any form, type, origin, or provider of virtual volumes.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for restoring consistency after performing consistency-breaking operations during live migration, said system comprising:
    a memory area associated with a computing device, said memory area storing a plurality of source virtual machines (VMs) in a consistency group (CG); and
    a processor programmed to:
        in response to receiving a request to perform a live migration of the plurality of source VMs on a source host to a destination host, create a snapshot of the CG of the plurality of source VMs;
        perform the live migration of the source VMs from the source host to the destination host, wherein consistency is not maintained during the live migration;
        restore, in response to a failure during the live migration, the source VMs using the snapshot; and
        complete the live migration.

2. The system of claim 1, wherein the processor is further programmed to terminate the source VMs when live migration is complete.

3. The system of claim 2, wherein the live migration of the plurality of the source VMs occurs simultaneously or sequentially.

4. The system of claim 1, wherein the processor is further programmed to notify the source VMs when corresponding destination VMs begin execution.

5. The system of claim 1, further comprising receiving a request to perform the live migration of the CG on the source host to the destination host.

6. The system of claim 1, wherein the data representing the source VM is stored on a virtual volume managed by a storage provider.

7. The system of claim 1, wherein the destination host is associated with hybrid cloud service.

8. The system of claim 1, wherein the processor is programmed to open one or more disks for precopying via an application programming interface.

9. A method comprising:
in response to receiving a request to perform a live migration of a plurality of source virtual machines (VMs) on a source host to a destination host, creating a snapshot of a consistency group (CG) of the plurality of source VMs;
performing the live migration of the source VMs from the source host to the destination host, wherein consistency is not maintained during the live migration;
restoring, in response to a failure during the live migration, the source VMs using the snapshot; and
completing the live migration, including transferring data that has not yet been replicated from the source VMs to the destination host.

10. The method of claim 9, further comprising receiving the request to perform the live migration.

11. The method of claim 9, further comprising notifying a destination VM on the destination host that the live migration has completed and consistency has been restored.

12. The method of claim 9, further comprising:
executing a CG of destination VMs on the destination host using the data after the live migration has completed; and
notifying the source VMs that the destination VMs have begun execution.

13. The method of claim 9, wherein the data representing the source VM is stored on a virtual volume managed by a storage provider.

14. The method of claim 9, wherein the source VMs are migrated in series or parallel.

15. The method of claim 9, wherein a recovery point objective (RPO) is violated during the live migration.

16. The method of claim 9, wherein the destination host is associated with a hybrid cloud service.

17. The method of claim 9, wherein completing the live migration comprises migrating only the source VMs which were not already successfully migrated.

18. One or more computer-readable storage media including computer-executable instructions that, when executed, cause at least one processor to:
in response to receiving a request to perform a live migration of a consistency group (CG) of a plurality of source virtual machines (VMs) on a source host to a destination host, generating a snapshot of the CG;
performing the live migration of the CG by transferring data representing the source VMs to the destination host, wherein consistency is not maintained during the live migration;
restoring the CG to the generated snapshot during a failure of the live migration; and
completing the live migration.

19. The computer-readable storage media of claim 18, wherein the destination host is associated with a hybrid cloud service.

20. The computer-readable storage media of claim 18, wherein generating the snapshot comprises recording a state of the CG.

* * * * *